Figure 1:
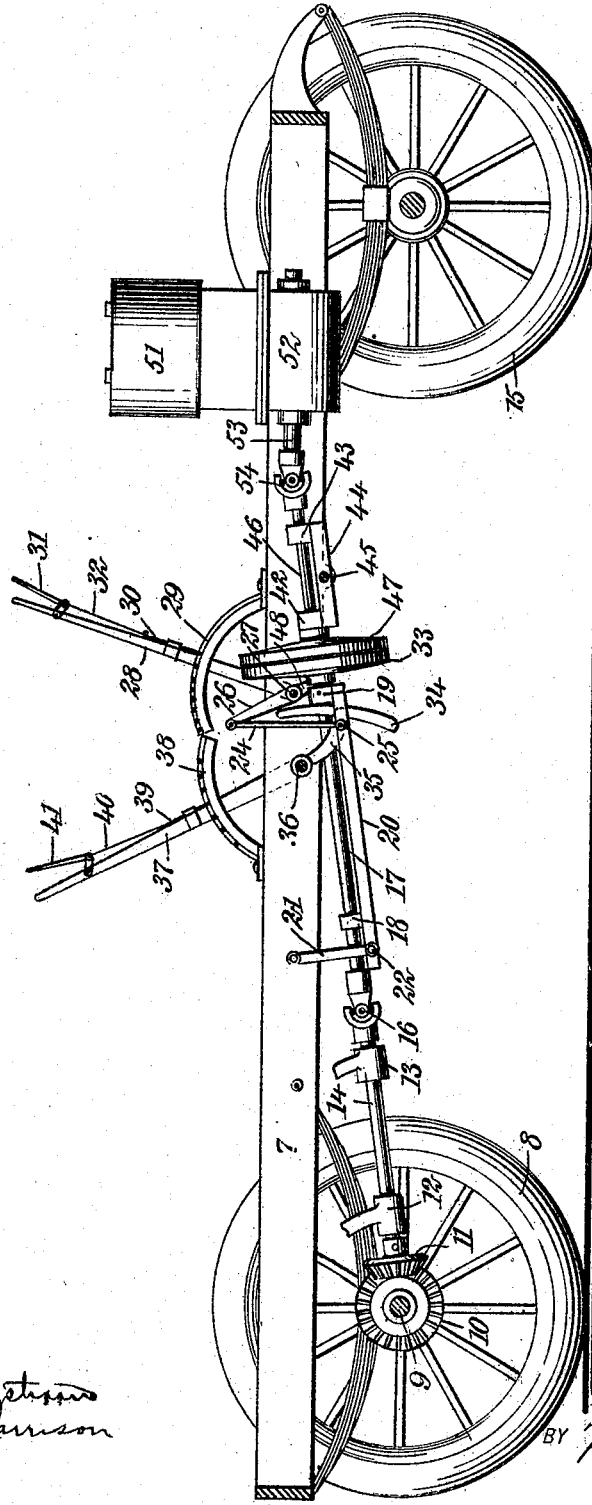

R. J. MILLION.
TRANSMISSION GEAR.
APPLICATION FILED JUNE 12, 1906.

900,111.

Patented Oct. 6, 1908.
8 SHEETS—SHEET 1.

WITNESSES
John A Bergstrom
Walton Harrison

INVENTOR
Robert J. Million
BY Munn & Co
ATTORNEYS

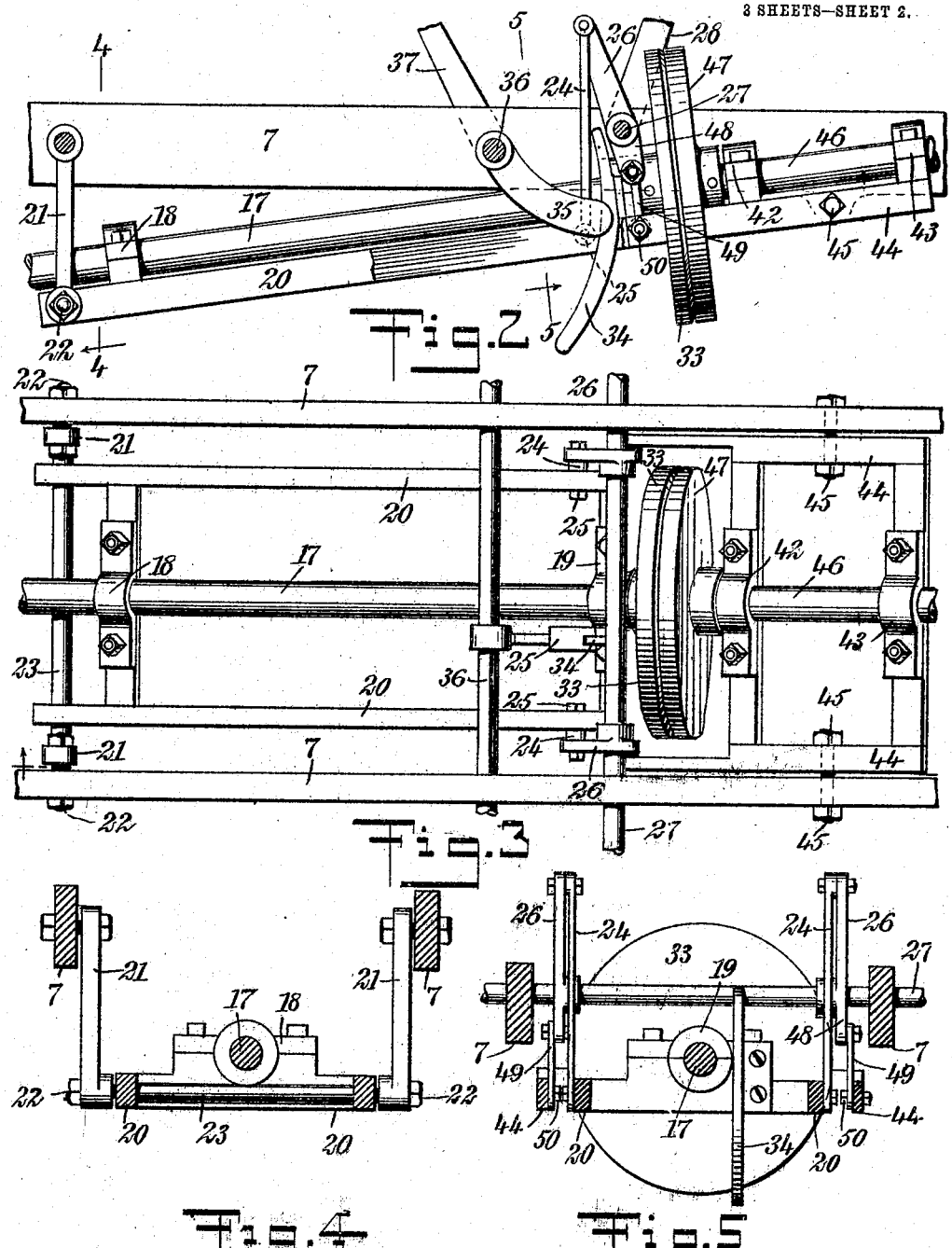

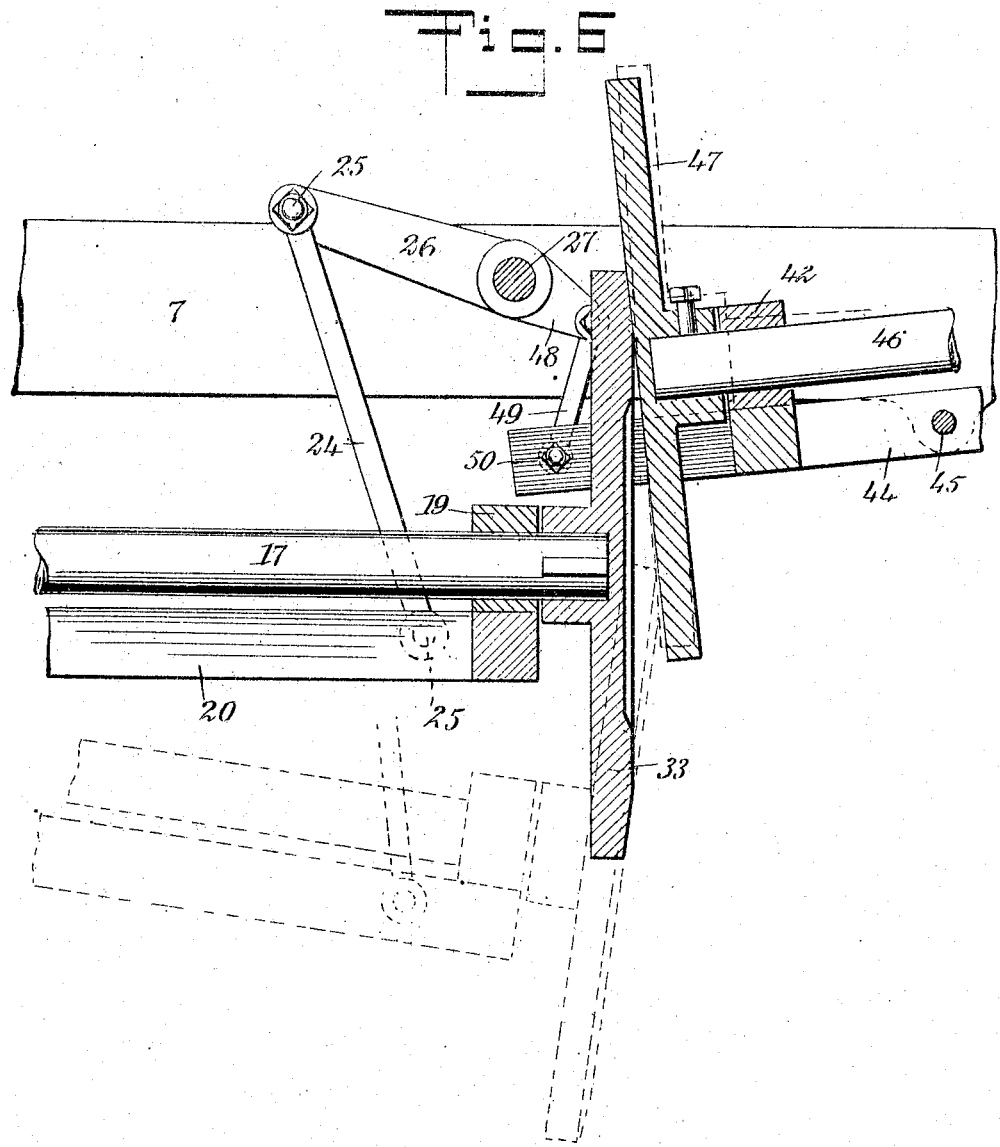

UNITED STATES PATENT OFFICE.

ROBERT J. MILLION, OF JEFFERSON TOWNSHIP, CARROLL COUNTY, INDIANA.

TRANSMISSION-GEAR.

No. 900,111.            Specification of Letters Patent.            Patented Oct. 6, 1908.

Application filed June 12, 1906. Serial No. 321,334.

*To all whom it may concern:*

Be it known that I, ROBERT J. MILLION, a citizen of the United States, and a resident of Jefferson township, in the county of Carroll and State of Indiana, have invented a new and Improved Transmission-Gear, of which the following is a full, clear, and exact description.

My invention relates to transmission gears for general use, and more particularly to a type of transmission gear used upon movable vehicles, and in various allied relations.

Among the several objects of my invention is to so couple the driving and driven members that considerable variations may be made in the speed or power as desired, and in which the direction of movement is readily reversed between the driving and driven members.

My invention further contemplates several constructional details whereby the general efficiency of the transmission gear is greatly improved.

Reference is to be had to the accompanying drawings forming a part of this specification, in which similar characters of reference indicate corresponding parts in all the figures.

Figure 1 is a side elevation partly in section, of an automobile provided with my improved transmission gear; Fig. 2 is a fragmentary side elevation partly in section, of the main driving and driven members, together with their immediate connections; Fig. 3 is a fragmentary plan of a portion of the frame work, and showing the relative positions of the principal driving and driven members, together with their immediate connections; Fig. 4 is a fragmentary vertical section upon the line 4—4 of Fig. 2, looking in the direction of the arrow and showing a part of the means for suspending the swinging frame 20; Fig. 5 is a fragmentary vertical section upon the line 5—5 of Fig. 2, looking in the direction of the arrow and showing the means for mounting the disk 33 and parts immediately connected with the same; Fig. 6 is an enlarged section through the friction disks and their immediate connections, and showing how the speed or power of the driven member is varied in accordance with bodily movement of transmission occurring simultaneously in both the driving and driven members.

It will be understood that the particular mechanism shown embodies one form of my invention, and that in the form illustrated I seek to confer the motion from one revoluble friction disk to another revoluble friction disk, by moving both disks laterally and in opposite directions, meanwhile rotating one of said disks.

The vehicle body is shown at 7, and is provided with driving wheels 8 and axles 9, rigidly connected therewith; these parts being of the usual or any desired construction. A bevel gear 10 is mounted rigidly upon the axle 9 and is turned by another bevel gear 11 wherewith it meshes, said latter gear being mounted on a revoluble shaft 14. Bearings 12, 13 support the shaft 14 and are connected at convenient points with the vehicle frame 7, the connections being shown broken away in the drawings for the sake of clearness.

The front wheels of the vehicle are shown at 15 and have nothing special to do with my invention. The shaft 14 is connected by means of a universal joint 16 with another shaft 17. The latter shaft is revolubly mounted in bearings 18, 19, carried by a swinging frame 20, the latter being supported at its rear end upon links 21, and pivots 22 at the lower ends of these links. The upper ends of the links 21 are pivoted directly to the vehicle frame 7 from which they depend. The pivots 22 are merely journals formed upon the ends of a rod 23 passing entirely through the swinging frame 20, as indicated more particularly in Fig. 4.

The front end of the swing frame 20 is supported by two links 24, disposed upon opposite sides thereof. These links are by means of pivots 25 connected at their lower ends with the swinging frame 20 and at their upper ends with arms 26. These arms are mounted rigidly upon a rocking shaft 27, and connected rigidly with this shaft is a hand lever 28. By moving the hand lever to the right or to the left, according to the view shown in Fig. 1, the front end of the swinging frame 20 (represented by the right-hand end according to Fig. 1) is raised or lowered. A sector 29 is disposed adjacent to the hand lever 28, and a pawl 30 carried by the hand lever engages the sector which is notched upon its upper surface for this purpose. A releasing handle 31 is also carried by the hand lever 28, and is connected by a rod 32 with a pawl 30, for the purpose of enabling the pawl to be released from or engaged with the sector 29. By manipulating the pawl 30, by means of the handle 31, the hand lever 28 may, within certain limits, be fixed at any desired point upon the sector 29.

Mounted rigidly upon the forward end of the revoluble shaft 27, and consequently supported by the swing frame 20, is a revoluble friction disk 33. Mounted rigidly upon the swinging frame 20 is a bearing sector 34 of arcuate form. Slidably engaging this bearing sector is a rocking fork 35, mounted rigidly upon a rocking shaft 36. Connected rigidly with this rocking shaft is a hand lever 37, adapted to move back and forth within certain limits. A sector 38, a pawl 39, a rod 40, and a handle 41 are associated with the hand lever 37, as will be understood from Fig. 1. By manipulating the hand lever 37 and the handle 41, the bearing fork 35 may be forced with greater or lesser pressure against the bearing sector 34, and in this manner the swinging frame 20 may be moved forward any desired extent. When the pressure exerted by the bearing fork 35 upon the bearing sector 34 is released, the weight of the swinging frame 20 causes it to recede, or in other words, to approach such position that the links 21 hang vertically.

Bearings 42, 43 are mounted upon opposite ends of a rocking frame 44, which is supported upon pivots 45, as indicated in Figs. 2 and 3. Revolubly mounted within the bearings 42, 43 is a revoluble shaft 46, and connected rigidly with this shaft is a friction disk 47. When the shaft 46 is turned, the friction disk 47, considered as a driving member, may transmit motion to the friction disk 33, considered as a driven member. The arms 26 while mounted upon the shaft 27, as above explained, extend a little below this shaft, being provided with portions 48 for this purpose. Depending from the portions 48 are links 49, and connecting the lower ends of these links with the frame 44 are pivots 50. As movements of the hand lever 28 must elevate and depress the portions 48 of the arms 26, it follows that such movements of the hand lever as tend to lower the revoluble disk 33, must also tend to raise the revoluble disk 47, and vice versa. The degree of bodily movement of the disk 47, however, that is to say, its degree of ascent or of descent, is considerably less than the degree of bodily movement of the disk 33. It follows from the arrangement shown, therefore, that when the hand lever 28 is moved forward or into the position indicated in Fig. 1, the disk 33 is raised and the disk 47 is lowered, the extremity of movement of the hand lever 28 being so gaged by the position of the sector 29 that the two disks 33, 47 become coaxial, as indicated in Fig. 1. When, however, the hand lever 28 is moved in an opposite direction, that is, toward the rear of the vehicle (represented by the left of Fig. 1), the disk 33 is lowered and the disk 47 is raised, the distance swept over by the disk 33 being greater than that swept over by the disk 47, the respective disks 33, 47 finally assuming the extreme position indicated by dotted lines in Fig. 6. These positions represent the extreme throw of the hand lever 37 to the left, according to the view shown in Fig. 1.

The movements of the hand lever 37 are independent of the movements of the hand lever 28. Such being the case, the frame 20 may be pressed forward (that is, to the right, according to Fig. 2), or allowed to recede no matter what may be the relative general positions occupied by the disks 33, 47. So, also, the disks 33, 47 may be shifted relatively to each other, as indicated in Fig. 6, without reference to the position of the hand lever 37, and consequently without reference to the degree of pressure, if any, existing between the revoluble disks.

As indicated by dotted lines in Fig. 6, the disks 33, 47 may by movements of the hand lever 28, be displaced to such an extent that the point of contact between the two disks may be either above or below the center of the shaft 46, as it is obvious from Fig. 6, when the point of contact between the disks is below the center of the shaft 46, the direction of movement of the disk 33 is reversed. When the point of contact, or rather when the point of mean pressure between the disks, coincides exactly with the center of rotation of the disk 47, little or no motion is conferred upon the disk 33. From the position thus indicated, the operator might cause the disk 33 to turn in the one direction or in the other by merely manipulating the hand lever 28. Of course, as an independent proposition, he can regulate pressure between the disks by means of the hand lever 37 as above described, and in this way can bring about any degree of lost motion between the disks. It follows, therefore, that he can attain any desired degree of firmness of coupling, ranging from a positive direct movement to a mere drag capable of conferring (for a given load) an almost unappreciable degree of movement.

As will be understood from the above description, my invention admits of considerable adaptation in its various uses.

I do not limit myself to any particular arrangement of levers or other equivalents for shifting the disks laterally, for the reason that various expedients may be used for this purpose. The main idea in shifting both the driving and driven disks is to obtain the low speeds and the reverse speed. By bringing both shafts 17, 46 exactly in line, the device gives direct transmission, the disks 33, 47 being locked together firmly by pressure under control of the hand lever 37. Since, however, any degree of laxity desired may be conferred by relaxing the hand lever 37, the movement while direct, can allow a greater or lesser degree of slip for the purpose of protecting the driven parts from breakage. No wear or tear of the device can affect the degree of tightness between these members, for the reason that this is entirely under the control of the operator. It will be observed also, that by shifting both of the friction disks 33, 47, instead of only one of them, each disk performs a minimum of lateral movement, and this is a very desirable object, for the reason that extreme displacement of gears of this kind does not work so well in practice as comparatively slight displacement thereof and the driven disk on reverse drive does not extend so far downwardly to contact with possible projections of an uneven roadway. Again, less movement upon the part of the operator is required because of the fact that both of the disks are moved. This arrangement also renders it easier for the operator because the disks 33, 47 tend to balance each other. The corners of the disk 33, adjacent to the disk 47, are beveled as best shown in Fig. 6 to increase the area of contact when the disks are out of parallelism, or direct transmission. This is a feature of much practical importance.

I do not limit myself to the use of universal joints or of any other particular part or parts employed in operating the friction disks. Neither do I limit myself to the particular form of disks shown, as other equivalent gear members for the same are well known in this art.

It will be noted that when the parts are in the positions indicated in Fig. 1 the drive is direct. In other words, the friction disks 33, 47 merely act as clutch members and thus allow the transmission to take place as if the shaft were made in one piece.

Having thus described my invention, I claim as new and desire to secure by Letters Patent:

1. The combination of a revoluble member, a frame mounted thereupon and adapted to move so as to allow the said revoluble member to swing bodily upon an axis different from its axis of rotation, another revoluble member engaging said first mentioned revoluble member, a movable member supporting said second mentioned revoluble member so as to allow it to swing upon an axis independent of its axis of rotation, said revoluble members engaging each other directly, and means for turning said first mentioned revoluble member.

2. The combination of a revoluble friction disk, means for turning the same, a rocking frame supporting said revoluble friction disk, another revoluble friction disk adapted to engage said first mentioned friction disk, a swinging frame supporting said second mentioned friction disk, and means for shifting said swinging frame and said rocking frame in opposite directions so as to vary the point of contact between said friction disks in order to change the relative speed therebetween.

3. The combination of a rocking frame provided with bearings, a revoluble shaft mounted within said bearings, a friction disk mounted upon said shaft and rotatable by movements of the same, a swinging frame provided with bearings, a revoluble shaft supported within said bearings, a friction disk mounted upon said last mentioned shaft, and mechanism connected with both of said frames for moving the same in opposite directions.

4. The combination of a pair of frames movable in opposite directions, friction disks revolubly supported upon said frames and normally coaxial with each other, means controllable at will for shifting said frames in opposite directions thereby varying the relative bodily positions of said friction disks, means for driving one of said disks, and a driven member connected with the other of said disks.

5. The combination of a revoluble friction driving member, a revoluble friction driven member, a movable frame supporting one of said members, an arcuate bearing member mounted upon said frame, a bearing fork engaging said arcuate bearing member, and mechanism connected with said bearing fork for forcing the same against said arcuate bearing member.

6. The combination of a revoluble friction driving member, a revoluble friction driven member, means for shifting said members relatively to each other in directions independent of their axes of rotation, universal joints connected with said driving and driven members respectively, and shafts connected with said universal joints.

7. In a transmission gear, the combination of a revoluble driving member, a revoluble driven member, and means for shifting both said revoluble driving member and said revoluble driven member so as to vary the relative speed therebetween.

8. The combination of a revoluble driving shaft, a revoluble driven shaft, friction disks mounted upon said shafts respectively and both adapted to be shifted to engage each other obliquely.

9. The combination of a revoluble driving shaft, a revoluble driven shaft, friction disks mounted upon said shafts respectively and both adapted to be shifted to engage each other obliquely, and means for varying the degree of pressure between said friction disks, and also for the purpose of locking said disks together for direct drive.

10. The combination of a revoluble driving shaft, a revoluble driven shaft, friction disks mounted upon said shafts respectively and both adapted to be shifted to engage each other obliquely and means for varying the degree of pressure between said friction disks.

11. The combination of revoluble friction disks, driving and driven members connected respectively thereto, means for shifting both of said friction disks relatively to each other, and means controllable at will for locking said disks together so as to render the drive direct.

12. In a speed changing mechanism, a driving wheel, a driven wheel with its side in frictional engagement with the side of the driving wheel, said driven wheel having an oblique corner, a shaft on which said driving wheel is mounted that is substantially coaxial with the driving wheel, means for mounting said shaft so that the end carrying the driven wheel may be oscillated, and means for oscillating such end of the driven shaft to contact the oblique corner of the driven wheel with the sides of the driving wheel.

13. In a speed changing mechanism, a driving wheel, a driven wheel with its side in frictional engagement with the side of the driving wheel, said driven wheel having an oblique corner, a shaft carrying the driven wheel that is coaxial with the driving wheel, a frame in which said shaft is mounted that is fulcrumed at a point remote from said driving wheel so that the end thereof carrying the driven wheel is free to oscillate, and means for oscillating said end of the shaft to contact the oblique corner of the driven wheel with the sides of the driving wheel.

14. In a speed changing mechanism, a driving wheel, a driven wheel with its side in frictional engagement with the side of the driving wheel, said driven wheel having an oblique corner, a shaft on which said driven wheel is mounted that is substantially coaxial with the driving wheel, means for mounting said shaft so that the end carrying the driven wheel will oscillate, means for oscillating such end of said driven shaft to contact the oblique corner of the driven wheel with the side of the driving wheel, and means that forces said shaft longitudinally toward the driving wheel to increase the forcefulness of the engagement of said wheels.

15. A pair of rotatable bodies one of which has a beveled corner so mounted on a common plane that a side of one body may engage a side or bevel of the other body, each body being operative by reason of such engagement to cause the other body to rotate whether said bodies be in axial alinement or angularly arranged to contact the side of one with the bevel of the other.

16. A pair of rotatable bodies one of which has a beveled corner so mounted on a common plane that a side of one body may frictionally engage a side or bevel of the other body, each body being operative by reason of such frictional engagement to cause the other body to rotate whether said bodies be in axial alinement or angularly arranged to contact the side of one with the bevel of the other.

17. A pair of rotatable bodies one of which has a beveled corner so mounted on a common plane that a side or bevel of one body may engage a side of the other body, each body being operative by reason of such engagement to cause the other body to rotate; one of said bodies being oscillatably movable transversely of its axis.

18. A pair of rotatable bodies one of which has a beveled corner so mounted on a common plane that a side or bevel of one body may engage a side of the other body, each body being operative by reason of such engagement to cause the other body to rotate; one of said bodies being oscillatably movable transversely of its axis; all in combination with means for moving one of said bodies oscillatably transversely of its axis.

19. A pair of rotatable bodies one of which has a beveled corner so mounted on a common plane that a side or bevel of one body may engage a side of the other body, each body being operative by reason of such engagement to cause the other body to rotate; one of said bodies being oscillatably movable transversely of its axis; all in combination with means for moving one of said bodies oscillatably transversely of its axis and means for locking the oscillatably movable body either in axial alinement or in angular adjustment with the other body.

20. A pair of rotatable bodies one of which has a beveled corner so mounted on a common plane that a side or bevel of one body may engage a side of the other body, each body being operative by reason of such engagement to cause the other body to rotate whether said bodies be concentric with or eccentric to each other; one of said bodies being oscillatably movable transversely of its axis; all combined with means for moving one of said bodies oscillatably transversely of its axis and means for locking the oscillatably movable body either in axial alinement or in angular adjustment with the other body.

21. A pair of rotatable bodies mounted on a common plane, each body having a surface which is engageable with a surface of the other body at variable and radially unequal parts of said surfaces and each body being operated by reason of such engagement to cause the other body to rotate at variable speed; both of said bodies being oscillatably movable transversely of their axes.

22. A pair of rotatable bodies mounted on a common plane, each body having a surface which is engageable with a surface of the other body at variable and radially unequal parts of said surfaces and each body being operative by reasons of such engagement to cause the other body to rotate at variable speed; both of said bodies being oscillatably movable transversely of their axes; all combined with means for moving said bodies oscillatably transversely of their axes.

23. A pair of rotatable bodies mounted on a common plane, each body having a surface which is engageable with a surface of the other body at variable and radially unequal parts of said surfaces and each body being operative by reason of such engagement to cause the other body to rotate at variable speed; both of said bodies being oscillatably movable transversely of their axes; all combined with means for moving both of said bodies oscillatably transversely of their axes, and means for locking the oscillatably movable bodies either in axial alinement or in angular adjustment with each other.

24. A pair of rotatable bodies mounted on a common plane, each body having a surface which is engageable with a surface of the other body and each body being operative by reason of such engagement to cause the other body to rotate; both of said bodies being oscillatably movable transversely of their axes; all combined with means for moving both of said bodies oscillatably transversely of their axes and means for locking the oscillatably movable bodies either in axial alinement or in angular adjustment with each other.

25. A pair of rotatable bodies one of which has a beveled corner so mounted on a common plane that a side of one body may engage a side or bevel of the other body, each body being operative by reason of such engagement to cause the other body to rotate; both of said bodies being oscillatably movable transversely of their axes.

26. A pair of rotatable bodies one of which has a beveled corner so mounted on a common plane that a side of one body may engage a side or bevel of the other body, each body being operative by reason of such engagement to cause the other body to rotate; both of said bodies being oscillatably movable transversely of their axes; all in combination with means for moving both of said bodies oscillatably transversely of their axes.

27. A pair of rotatable bodies one of which has a beveled corner so mounted on a common plane that a side of one body may engage a side or bevel of the other body, each body being operative by reason of such engagement to cause the other body to rotate; both of said bodies being oscillatably movable transversely of their axes; all in combination with means for moving both of said bodies oscillatably transversely of their axes and means for locking the oscillatably movable bodies either in axial alinement or in angular adjustment with each other.

28. A pair of rotatable bodies so mounted on a common plane that a side of one body may engage a side of the other body, each body being operative by reason of such engagement to cause the other body to rotate; both of said bodies being oscillatably movable transversely of their axes.

29. A pair of rotatable bodies so mounted on a common plane that a side of one body may engage a side of the other body, each body being operative by reason of such engagement to cause the other body to rotate; both of said bodies being oscillatably movable transversely of their axes; all in combination with means for moving both of said bodies oscillatably transversely of their axes.

30. A pair of rotatable bodies so mounted on a common plane that a side of one body may engage a side of the other body, each body being operative by reason of such engagement to cause the other body to rotate; both of said bodies being oscillatably movable transversely of their axes; all in combination with means for moving both of said bodies oscillatably transversely of their axes and means for locking the oscillatably movable bodies either in axial alinement or in angular adjustment with each other.

31. A pair of rotatable bodies so mounted on a common plane that a side of one body may engage a side of the other body, each body being operative by reason of such engagement to cause the other body to rotate whether said bodies be concentric with or eccentric to each other; both of said bodies being oscillatably movable transversely of their axes; all combined with means for moving both of said bodies oscillatably transversely of their axes, and means for locking the oscillatably movable bodies either in axial alinement or in angular adjustment with each other.

32. A pair of rotatable bodies one of which has a beveled corner so mounted on a common plane that a side of one body may engage a side or bevel of the other body, each body being operative by reason of such engagement to cause the other body to rotate whether said bodies be concentric with or eccentric to each other; both of said bodies being oscillatably movable transversely of their axes; all combined with means for moving both of said bodies oscillatably transversely of their axes and means for locking the oscillatably movable bodies either in axial alinement or in angular adjustment with each other.

In testimony whereof I have signed my name to this specification in the presence of two subscribing witnesses.

ROBERT J. MILLION.

Witnesses:
  WILLIAM E. UHL
  F. A. TURFLER.